United States Patent [19]

Murata et al.

[11] Patent Number: 4,765,446

[45] Date of Patent: Aug. 23, 1988

[54] HYDRAULIC DAMPER OF ADJUSTABLE DAMPING FORCE TYPE

[75] Inventors: Hiroshi Murata; Kunihiko Terasawa, both of Kanagawa, Japan

[73] Assignee: Tokico Ltd., Kanagawa, Japan

[21] Appl. No.: 11,918

[22] Filed: Feb. 5, 1987

[30] Foreign Application Priority Data

Feb. 20, 1986 [JP] Japan .................. 61-23402[U]

[51] Int. Cl.$^4$ ............................................. F16F 9/34
[52] U.S. Cl. .................. 188/319; 188/299; 188/322.15; 251/310
[58] Field of Search ............................... 188/317–319, 188/299, 285, 280, 281, 282, 322.22, 322.15, 287, 286, 322.13, 322.14, 315; 251/310, 129.19; 137/512.15, 516.11

[56] References Cited

U.S. PATENT DOCUMENTS

| | | | |
|---|---|---|---|
| 4,527,676 | 7/1985 | Emura et al. | 188/299 |
| 4,620,619 | 11/1986 | Emura et al. | 188/319 |
| 4,635,906 | 1/1987 | Buma | 188/299 X |
| 4,645,043 | 2/1987 | Imaizumi | 188/319 |
| 4,645,044 | 2/1987 | Kato et al. | 188/319 |

FOREIGN PATENT DOCUMENTS 2123922 2/1984 United Kingdom ............... 188/319

Primary Examiner—Douglas C. Butler
Attorney, Agent, or Firm—Wenderoth, Lind & Ponack

[57] ABSTRACT

A hydraulic damper of the adjustable damping force type includes a cylinder, a piston rod having an end portion inserted into the cylinder and a bore formed therein and extending in the axial direction thereof, a piston secured to one end portion of the piston rod and partitioning the interior of the cylinder into two chambers, a passage for communicating the two chambers through the bore, at least one pair of orifices disposed midway along the passage, an adjusting rod rotatably inserted into the bore and adapted to be operated from the side of the other end portion of the piston rod, and a shutter secured to the adjusting rod and having a pair of openings radially formed so as to open the at least one pair of orifices. The at least one pair of orifices and the pair of openings are arranged such that either one of the pair of orifices starts to open and close after the other.

6 Claims, 2 Drawing Sheets

HYDRAULIC DAMPER OF ADJUSTABLE DAMPING FORCE TYPE

BACKGROUND OF THE INVENTION

1. Field of the Invention

The present invention relates to a hydraulic damper, and more particularly to a hydraulic damper of the adjustable damping force type.

2. Prior Art

A typical well known hydraulic damper of the adjustable damping force type generally comprises a cylinder containing hydraulic liquid, a piston rod having a bore formed therein and extending axially thereof, with one end thereof inserted into the cylinder and with the other end thereof extending to the outside of the cylinder, a piston secured to the one end of the piston rod and partitioning the interior of the cylinder into two liquid chambers, a liquid passage allowing for communication between the two chambers through the bore in the piston rod, at least a pair of orifices disposed midway of the liquid passage, an adjusting rod rotatably inserted into the bore in the piston rod and being adapted to be rotatably operated from the side of the other end of the piston rod, and a shutter secured to one end of the adjusting rod and having a pair of openings radially formed therein for opening and closing both of the orifices.

However, in a hydraulic damper according to the prior art such as described hereinfore, each of the two orfices comprising a pair are located at positions which are diametrically opposed along the diametral line of the liquid passage. The openings formed in the shutter are also located at positions which are diametrically opposed along the diametral line of the shutter. Therefore, when the orifices are opened and closed through the openings in the shutter, each of the two orifices which comprise a pair begin to open and close substantially simultaneously, and as a result the damping force generated changes rapidly. Such rapid changes in the damping force very often cause unusual noises and vibration.

SUMMARY OF THE INVENTION

The object of the present invention is to solve the aforementioned problems and the invention provides a hydraulic damper of the adjustable damping force type wherein rapid changes of the damping force to be generated are prevented when orifices are opened and closed by a shutter so that unusual noises and vibration do not occur.

According to the invention, when a shutter rotates to open and shut a pair of orfices, either one of the orifices is adapted to begin to open and shut subsequent to the other.

BRIEF DESCRIPTION OF THE DRAWINGS

The objects and features of the invention may be understood by referring to the following detailed description of illustrative embodiments of the invention, taken together with the accompanying drawings in which.

DETAILED DESCRIPTION OF THE PREFERRED EMBODIMENTS

Referring to FIGS. 1 to 4, the preferred embodiments will be explained.

Figure 1:
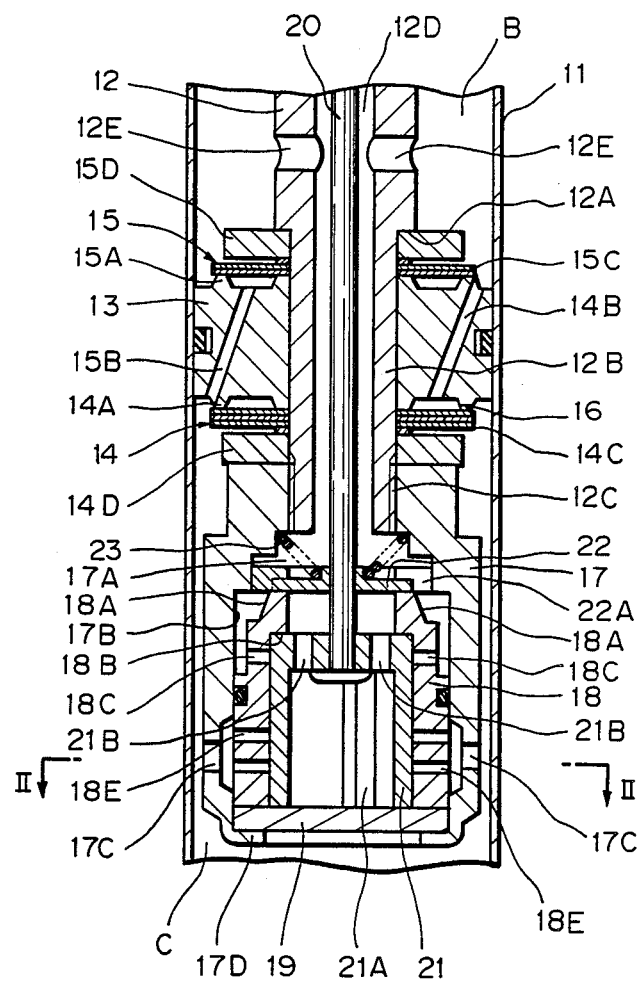
FIG. 1 is a longitudinal sectional view showing the essential portion of a hydraulic damper according to a first embodiment of the invention.
Figure 2:
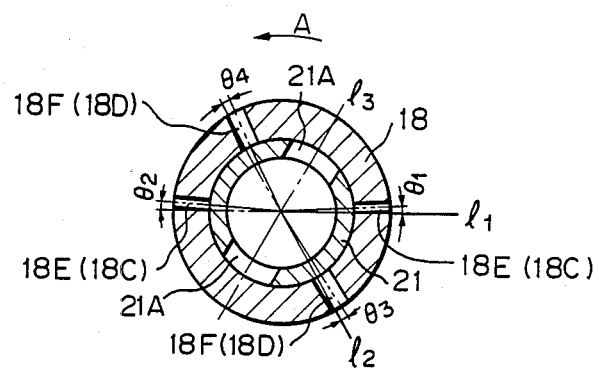
FIG. 2 is a sectional view taken along line II—II in FIG. 1 and showing the essential portion.
Figure 3:
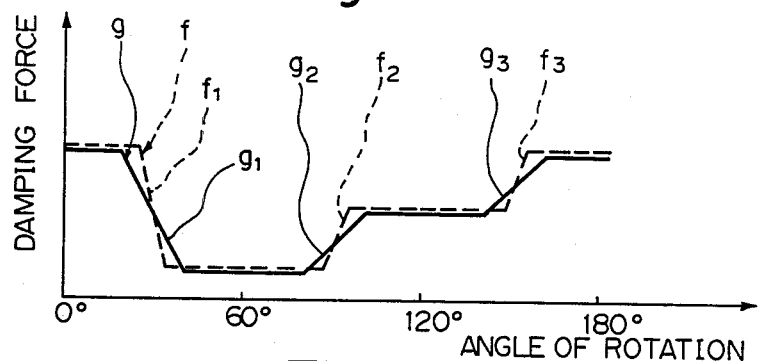
FIG. 3 is a characteristic curve showing the relationship between the rotating angle of a shutter and damping force.

FIGS. 1 to 3 show a first embodiment of the invention.

Shown at 11 is a cylinder or inner tube disposed in the body of a hydraulic damper and which cooperates with an outer tube (not shown) to define therebetween an annular reservoir chamber (not shown). Piston rod 12 is inserted into the inner tube 11 at one end portion thereof with the other end portion thereof extending through the outer and inner tubes to the outside thereof. A small diameter portion 12B is formed on one end portion of the piston rod 12 through a stepped portion 12A and a male screw 12C is formed on the circumference of the end of the small diameter portion 12B. The piston rod 12 includes a bore 12D formed therein and axially extending through the whole length thereof, into which an adjusting rod 20 which will be explained hereinafter is rotatably inserted. The piston rod 12 also includes apertures 12E formed radially therein and which communicate the bore 12D with a liquid chamber B to be explained hereinafter.

A piston 13 is secured to the small diameter portion 12B of the piston rod 12. The piston 13 is slidable with the piston rod 12 in the inner tube 11 and defines the interior of the inner tube 11 into two liquid chambers B and C. The piston 13 is provided with damping force generating mechanisms 14 and 15 which are adapted to generate predetermined damping forces in response to the extension and contraction of the piston rod 12, respectively. The damping force generating mechanisms 14, 15 include annular valve seats 14A and 15A formed on the opposite surfaces of the piston 13, inclined passages 14B and 15B formed therein and communicating the interiors of the annular valve seats 14A and 15A with the liquid chambers B and C, respectively, disk valves 14C and 15C adapted to contact with and separate from the valve seats 14A and 15A, respectively, thereby to disconnect and connect the communication between the liquid chambers B and C, and retainers 14D and 15D for retaining the disk valves 14C and 15C, respectively. The retainers 14D, 15D and the disk valves 14C, 15C are fitted on the small diameter portion 12B of the piston rod 12 together with the piston 13 and are fastened by a tubular member 17 onto the stepped portion 12A. A cutout 16 is radially formed in the valve seat 14A and permanently communicates the liquid chambers B and C through the passage 14B so that a large damping force is generated when liquid flows through the cutout 16.

The tubular member 17 screw-engages with the male screw 12C of the piston rod 12 and secures the piston 13, etc. on the small diameter portion 12B of the piston rod 12. The tubular member 17 takes the form of a tube with steps and includes therein a check valve receiving portion 17A located on the upper side and an orifice tube receiving portion 17B located under the check valve receiving portion 17A and larger in diameter than the latter. The tubular member 17 also includes a plurality of apertures 17C formed radially and located in the lower portion of the orifice tube receiving portion 17B, which apertures 17C cooperate with the interior of the tubular member 17 and the liquid holes 12E in the piston rod 12 to define a liquid passage which allows the liquid chambers B and C to communicate through the bore 12D. The lower end portion of the tubular member 17 is a bent portion 17D which is adapted to be bent radially inwardly as shown in FIG. 1.

Shown at 18 is an orifice tube which is fitted into the orifice tube receiving portion 17B and secured therein by means of a closing plate 19 and the bent portion 17D. The orifice tube 18 has a plurality of liquid grooves 18A formed in the outer circumference of the upper portion thereof and a shoulder portion 18B formed in the inner circumference thereof. The shoulder portion 18B sets a shutter 21, which will be explained hereinafter, axially in place between the closing plate 19 and the shoulder portion 18B. The orifice tube includes upper orifices 18C and 18 D and lower orifices 18E and 18F which define at least a pair of orifices disposed midway along the liquid passage. Each of the two orifices which make a pair are generally diametrically opposed (see FIG. 2). The lower orifices 18F consist of two pairs of orifices which are axially spaced slightly apart from each other as well as the lower orifices 18E shown in FIG. 1.

The lower orifices 18E are formed with a relatively small diameter and are equal in their cross-sectional area so as to have the same mode. The alignment of a group of lower orifices 18E located on the right side (see FIG. 1) deviates from a diametral line $l_1$ of the orifice tube 18 by an angle $\theta_1$ in the direction designated by the arrow A shown in FIG. 2 while the alignment of the other group of lower orifices 18E located on the left side deviates from the line $l_1$ by an angle $\theta_2$ in the direction opposite to that of the arrow A. The lower orifices 18F are formed with a relatively large diameter and are equal in their cross-sectional area so as to have the same mode. Of these, a group of orifices 18F located on the lower side in FIG. 2 are so disposed that their alignment deviates from a diametral line $l_2$ of the orifice tube 18 by an angle $\theta_3$ in the direction of the arrow A, while the alignment of the other group of lower orifices 18F located on the upper side in FIG. 2 deviates from the line $l_2$ by an angle $\theta_4$ in the direction opposite to that of the arrow A. The lower orifices 18E and 18F permanently communicate with the liquid holes 17C in the tubular member 17.

The upper orifices 18C, 18D are axially spaced from the lower orifices 18E and 18F by a predetermined distance but are located circumferentially at the same position as the lower orifices 18E and 18F, respectively. The upper orifices 18C are formed with a relatively small diameter similar to that of the lower orifices 18E and the upper orifices 18D are formed with a relatively large diameter similar to that of the lower orifices 18F. The upper orifices 18C and 18D permanently communicate with the liquid grooves 18A. Since each of the upper orifices 18C, 18D consists of a pair of orifices while each of the lower orifices 18E, 18F consists of two pairs of upper and lower orifices, the cross-sectional area of the openings of the upper orifices 18C and 18D are about one half that of the lower orifices 18E and 18F, respectively. As described hereinfore, since the upper orifices 18C, 18D and the lower orifices 18E, 18F are so located that their alignment deviates by angles $\theta_1$, $\theta_2$, $\theta_3$ and $\theta_4$, respectively, from the lines $l_1$ or $l_2$, one of each of the two orifices which form a pair of upper or lower orifices 18C, 18D, 18E and 18F is delayed with respect to the other of that pair at the time when opening and shutting commences when a shutter 21 is rotated in the direction of the arrow A. The angles $\theta_1$, $\theta_2$, $\theta_3$ and $\theta_4$ may be the same or different from each other.

Shown at numeral 20 is an adjusting rod 20 is rotatably inserted into the bore 12D in the piston rod 12 and is adapted to be rotatably operated through an actuator (not shown) for controlling the damping force and which is mounted on the projecting end of the piston rod 12. The shutter 21 is secured to the lower end of the adjusting rod 20 by suitable means and is adapted to be rotated integrally with the adjusting rod 20. The shutter 21 is in the form of a tube with the upper end being closed and is rotatably fitted in the orifice tube 18. In the axial direction of the shutter 21, as shown in FIG. 2, a pair of openings 21A are formed along a diametral line $l_3$ and are thus diametrically opposed to each other. The openings 21A are formed such as to be wider than the relatively large diameter orifices 18F and 18D. The openings 21A are formed by cutting the wall of the shutter 21 through from the upper side at the closed end to the lower end thereof with the cut being of a predetermined width as shown in FIG. 1 whereby these openings 21A can serve to open and close all of the aforementioned upper and lower orifices 18C, 18D, 18E and 18F. Thus, as the shutter 21 is rotated through the adjusting rod 20 in the direction designated by the arrow A, the relatively large diameter orifices 18D, 18E and the small diameter orifices 18C, 18F are selectively opened and closed in turn, thereby controlling the damping force. Provided in the closed end of the shutter 21 are a plurality of apertures 21B that are axially formed and radially spaced from the adjusting rod 20. These apertures 21B permit the liquid in the shutter 21 to flow into a check valve 22 which will be explained hereinafter.

The check valve 22 is accommodated within the check valve receiving portion 17A of the tubular member 17 and is biased by the force of a spring 23 to abut against the upper surface of the orifice tube 18. When the openings 21A in the shutter 21 open the orifices 18C, 18E or the orifices 18D, 18F, the check valve 22 opens only during the contracting stroke of the piston rod 12 to allow the liquid in the liquid chamber C to flow into the liquid chamber B through the apertures 17C, the orifices 18E or 18F, the apertures 21B, the bore 12D and apertures 12E. The check valve 22 is provided in the outer circumference thereof with a plurality of grooves 22A, which grooves 22A allow the liquid in the chamber B to flow into the chamber C through the apertures 12E and the bore 12D, and further through the liquid grooves 18A in the orifice tube 18, the orifices 18C, 18E or 18D, 18F and the apertures 17C during the extension stroke of the piston rod 12. As a result, when the orifices 18C, 18E or 18D, 18F are opened through the apertures 21A, a damping force is generated by the lower orifices 18E or 18F during the contraction stroke of the piston rod 12, while a damping force is generated by the upper orifices 18C or 18D during the extension stroke of the piston rod 12. Thus, it is possible to make the damping force in the extension stroke larger than that in the contraction stroke.

The operation of the above-mentioned hydraulic damper of adjustable damping force type will now be explained.

Firstly, in the condition wherein the shutter 21 is at the position shown in FIG. 2, the upper orifices 18C, 18D and the lower orifices 18E, 18F are closed. Thus, the liquid in the liquid chambers B and C is allowed to flow only through the passage 14B and the cutout 16 during initial portions of the extension and the contraction strokes of piston rod 12 and a large damping force is generated by the cutout 16, thereby setting the damping force in a hard mode. When the speed of the piston rod 12 exceeds a predetermined level, the disk valve 14C opens during the extension stroke of the piston rod 12 while the disk valve 15C opens during the contraction stroke to generate respective predetermined damping forces.

Next, when the shutter 21 is rotated through the adjusting rod 20 in the direction of the arrow A to open the upper orifices 18D and the lower orifices 18F, during the extension stroke the liquid in the chamber B flows into the interior of the shutter 21 through the apertures 12E, the bore 12D, the grooves 22A of the check valve 22, the grooves 18A of the orifice tube 18 and the upper orifices 18D, and further flows into the chamber C through the lower orifices 18F and the apertures 17C. In this condition, a small damping force that is determined by the upper orifices 18D is generated. During the contraction stroke, the liquid in the chamber C flows into the interior of the shutter 21 through the apertures 17C and the lower orifices 18F and further flows into the chamber B through the apertures 21 in the closed end of the shutter, the check valve now opened, bore 12D and the apertures 12E, thereby generating a damping force that is determined by the lower orifices 18F which is smaller than the aforementioned damping force generated in the extension stroke. Thus, the mode of the damping force is set in a soft condition, since the orifices 18D and 18F have large diameters.

When the shutter 21 is further rotated in the direction of the arrow A, the upper orifices 18C and the lower orifices 18E are opened. At this condition, since the orifices 18C and 18E are larger than the cutout 16 but smaller than the orifices 18D, 18F, the respective medium damping forces determined by the upper orifices 18C and the lower orifices 18E are generated in the extension and the contraction strokes of the piston rod 12. Thus, the mode of the damping force is set in a medium condition which is between the hard and the soft conditions mentioned above. Even when the orifices 18D, 18F or the orifices 18C, 18E are opened through the openings 21A of the shutter 21, the disk valves 14C and 15C are opened so that predetermined damping forces are generated when the speed of the piston rod 12 exceeds a predetermined level.

According to the present embodiment, and as shown in FIG. 2, one group of the orifices 18F, 18D is so located that its alignment deviates from the diametral line $l_2$ of the orifice tube 18 by the angle $\theta_3$, while the other group of the orifices 18F, 18D is so located that its alignment deviates from the line $l_2$ by the angle $\theta_4$. Further, the two groups comprised by the orifices 18E and 18C are so located that their alignment deviates from the line $l_1$ by the angles $\theta_1$ and $\theta_2$, respectively. Therefore, when the shutter is rotated from the position shown in FIG. 2 in the direction of the arrow A to change the damping force from a large one to a small one, one group of the orifices 18F and 18D is opened by the corresponding opening 21A starts to open after the other group of orifices 18F and 18D opened by the other opening 21A starts to open. As a result, it is possible to prevent rapid change of the damping force from a large level to a small level. When the shutter 21 is further rotated in the direction of the arrow A to change the damping force from the small mode to the medium mode, one group of orifices 18F and 18D starts to close subsequent to closing of the other group, and one group of the orifices 18E and 18C also starts to open after opening of the other group. Therefore, it is again possible to prevent rapid change of the damping force. Furthermore, when the shutter 21 is further rotated in the direction of the arrow A to change the damping force from the medium mode to the hard mode, rapid change in the damping force is also prevented.

In this embodiment, therefore, when the shutter 21 is rotated in the direction of the arrow A to control the damping force, the damping force changes in the manner shown by characteristic curve g designated by a solid line in FIG. 3 and rapid change in the damping force is prevented since it is possible to allow the damping force to change gently. Segments $g_1$, $g_2$ and $g_3$ in the characteristic curve g show the manner in which change takes place in the respective cases wherein the damping force changes from the hard mode to the soft mode, from the soft mode to the medium mode, and from the medium mode to the hard mode. For purposes of comparison, a characteristic curve f corresponding to a prior art hydraulic damper is shown by the broken line in FIG. 3. The segments $g_1$, $g_2$ and $g_3$ have smaller angles of inclination than the segments $f_1$, $f_2$ and $f_3$ in the characteristic curve f representing the prior art. These gentle changes in the damping force allow the generation of unusual vibration and noise to be prevented.

Figure 4:
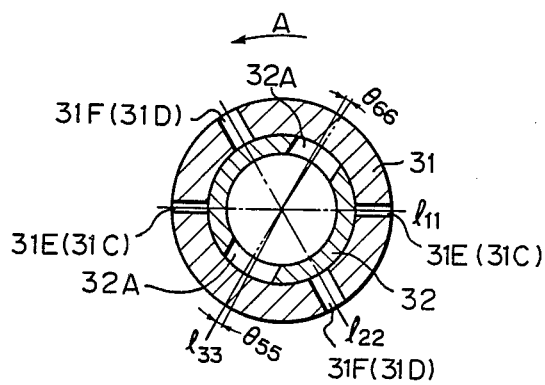
FIG. 4 is a view similar to FIG. 2 but showing a second embodiment of the invention.

FIG. 4 shows a second embodiment according to the invention, in which openings in a shutter are located at positions which deviate by certain angles from diametrically opposed positions.

In FIG. 4, shown at 31 and 32 are an orifice tube and a shutter, respectively. The orifice tube 31 and shutter 32 are formed such as to be generally similar to the orifice tube 18 and shutter 21 in the first embodiment explained hereinfore. In the orifice tube 31, however, two pairs of lower orifices 31E and a pair of upper orifices 31C are formed with small diameters and are located in diametrically opposed positions along a diametral line $l_{11}$ of the orifice tube 31, while two pairs of lower orifices 31F and a pair of upper orifices 31D are formed with large diameters and are located in diametrically opposed positions along a diametral line $l_{22}$ of the orifice tube 31. Meanwhile, the shutter has a pair of openings 32A which are formed with a certain width. The alignment of one of the openings 32A deviates from a diametral line $l_{33}$ of the shutter 32 by an angle $\theta_{55}$ in the direction of the arrow A and the alignment of the other deviates by an angle $\theta_{66}$ in the direction opposite to that of the arrow A. The angles $\theta_{55}$ and $\theta_{66}$ may be the same, or alternatively may be different from each other.

According to this embodiment also, it is possible for either one of each pair of orifices to be adapted to start to open and close after the other.

In the aforementioned embodiments, the two groups of orifices 18E, 18C deviate from the line $l_1$ by angles $\theta_1$ and $\theta_2$, respectively, the two groups of orifices 18E, 18D deviate from the line $l_2$ by angles $\theta_3$ and $\theta_4$, respectively, and the two openings 32A deviate from the line $l_{33}$ by angles $\theta_{55}$ and $\theta_{66}$, respectively. However, one group of angles $\theta_1$, $\theta_3$ and $\theta_5$ and $\theta_2$, $\theta_4$ and $\theta_6$ may be zero. Instead of the shutter 21 in the first embodiment, the shutter 32 in the second embodiment may be disposed in the orfiice tube 18. Further, when each of the two orifices and openings which make a pair are diametrically opposed, it is possible to make one orifice start to open and close subsequent to the other by, for example, combining a circular orifice and an oval orifice as a pair, or by making one opening wider than the other. Application of the invention is not limited to the case where damping force is changed in three modes and it may if desired be changed in two modes.

As described above, according to the invention, when at least a pair of orifices are opened and closed through the rotation of a shutter, one of the pair of orifices is adapted to start to open and close after the other. Namely, when a damping force is changed, it does not happen that both orifices of the pair simultaneously start to open and close. Therefore, it is possible to make the effective sectional area gradually increase and decrease and to prevent any rapid change in the damping force. Thus, it is possible to prevent the generation of unusual vibration and/or noises when the damping force is changed.

It is to be understood that the forms of the present invention herein shown and described are to be taken as preferred examples of the same and that various changes in the shape, size and arrangement of parts may be resorted to without departing from the spirit of the invention or the scope of the subjoined claims.

What is claimed is:

1. A hydraulic damper of the adjustable damping force type and which has a plurality of different damping force modes, said damper comprising:
   a cylinder containing hydraulic liquid therein;
   a piston rod having a first end portion thereof inserted into said cylinder and a second end portion thereof extending to the outside of said cylinder, said piston rod having a bore formed therein and extending axially thereof;
   a piston secured to said first end portion of said piston rod and partitioning the interior of said cylinder into two liquid chambers;
   a liquid passage for communicating said two liquid chambers, said liquid passage including a portion of said bore formed in said piston rod;
   at least one pair of orifices disposed midway along said liquid passage, such that selective opening and closing of said orifices changes the damping force mode of said damper;
   an adjusting rod rotatably inserted into said bore and adapted to be operated rotatably from said second end portion of said piston rod;
   a shutter secured to said adjusting rod and having a pair of radially formed openings for, upon rotation of said adjusting rod and said shutter, opening both of the two orifices of said pair of orifices in one of said different damping force modes and not opening either of said two orifices of said pair in other modes of said different damping force modes; and
   at least one of said pair of orifices and said pair of openings being arranged such that either one of said two orifices of said pair starts to open subsequent to the other said orifice when said shutter is rotated to change the damping force mode from one of said other modes to said one mode, and either one of said two orifices of said pair starts to close subsequent to the other said orifice when said shutter is rotated to change the damping force mode from said one mode to one of said other modes.

2. A hydraulic damper as claimed in claim 1, wherein said two orifices of said pair have equal cross-sectional areas.

3. A hydraulic damper as claimed in claim 1, wherein said two orifices of said pair are located at positions deviated from a diametral line of said liquid passage in circumferential directions of said liquid passage approaching each other.

4. A hydraulic damper as claimed in claim 1, wherein said two openings of said pair are located at positions deviated from a diametral line of said shutter in circumferential directions of said shutter approaching each other.

5. A hydraulic damper as claimed in claim 1, wherein one of said two orifices of said pair is circular and the other is oval.

6. A hydraulic damper as claimed in claim 1, wherein one of said two openings of said pair is wider than the other.

* * * * *